Figure 1:
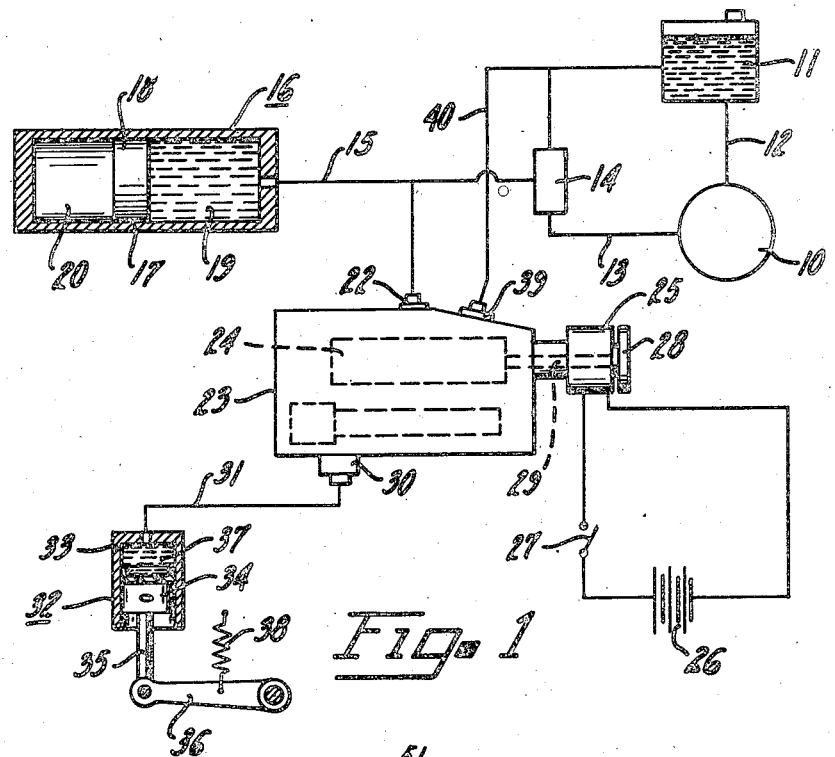

June 7, 1949. L. C. CHOUINGS 2,472,694
LIQUID PRESSURE OPERATED CONTROLLING SYSTEM
Filed April 13, 1944

INVENTOR
LESLIE CYRIL CHOUINGS
BY Cecil G. Arens
ATTORNEY

Patented June 7, 1949

2,472,694

UNITED STATES PATENT OFFICE 2,472,694

LIQUID PRESSURE OPERATED CONTROLLING SYSTEM

Leslie Cyril Chouings, Leamington Spa, England, assignor to Automotive Products Company Limited, Leamington Spa, England Application April 13, 1944, Serial No. 530,934
In Great Britain January 29, 1943

7 Claims. (Cl. 137—144)

This invention relates to liquid pressure operated controlling systems such as those employed in an epicyclic gear box for engaging the brake bands by which the gears are brought into action. The invention is, however, applicable to various other liquid pressure operated controlling systems in which a substantially constant working stroke is desired, e. g. those for operating clutches.

In such controlling systems it is often desirable, in order to obtain a sweet action with a minimum of noise, vibration and strain, to arrange for the main part of the working stroke to be effected quickly and the final part relatively slowly and it is the object of the present invention to provide an improved arrangement in which this effect is obtained in a simple but efficient manner. It is a further object of the invention to provide an improved construction of control valve device arranged to operate automatically for reducing the rate of delivery of the pressure liquid as the end of the working stroke is approached.

In a liquid pressure operated controlling system, comprising a source of pressure liquid, a motor unit, and a control valve for admitting pressure liquid from the source to the motor unit, the present invention is characterised by the fact that a flow controlling device provides a plurality of parallel paths for liquid to the motor unit, one substantially unrestricted, and another restricted by a choke or flow resistance, said flow controlling device comprising a pressure-responsive valve member which is influenced in opposite directions by pressure liquid and by resilient means, respectively, and is arranged to control the unrestricted liquid path in accordance with changes of pressure of the liquid acting on said pressure-responsive valve member.

According to a further aspect of the invention there is provided a liquid pressure operated controlling system comprising a source of pressure liquid, a motor unit, a control valve for admitting pressure liquid from the source to the motor unit, and a flow controlling device between the valve and the motor unit, the flow controlling device providing two parallel paths for the liquid, one substantially unrestricted and the other restricted by a choke or flow resistance, and including a pressure-responsive valve member having an unbalanced area subjected to the pressure of the liquid and supported against the liquid pressure by resilient means, the said valve member being adapted to control the unrestricted liquid path in accordance with changes of pressure of the liquid.

Preferably the pressure-responsive valve member is acted upon in the closing direction by the pressure liquid disposed between the control valve and the motor unit, and closes against spring influence when the pressure of said liquid exceeds a predetermined value. The pressure-responsive valve member may comprise a plunger slidable within a valve body and having one end exposed to the pressure liquid which leaves the control valve, that end of the plunger which is acted upon by the pressure liquid conveniently being formed with a head which engages an annular seating in the bore to close the pressure-responsive valve. The choke or flow resistance may be incorporated in the pressure-responsive valve member and is movable therewith; further, said choke or flow resistance can comprise a stack of apertured plates assembled in spaced relationship upon a stem, with the apertures of adjacent plates disposed out of register, the plates preferably being dished so that when stacked one upon the other they form a succession of thin closed chambers communicating with one another by apertures in the plates.

According to a further aspect of the invention there is provided for a liquid pressure operated controlling system, a control valve device comprising in combination an inlet for pressure liquid, an outlet connection leading to a motor unit, a reservoir connection, a control valve connected directly with the pressure inlet connection, a choke or flow resistance connected permanently between the pressure outlet of the control valve and the outlet connection of the device, a pressure-responsive valve connected across the said choke or flow resistance and normally spring urged to an open position, and pressure responsive means acted upon by the pressure liquid in the outlet from the control valve and arranged to oppose the spring influence upon the pressure-responsive valve, so that when the pressure in the control valve outlet exceeds a predetermined value the pressure-responsive valve is closed and causes the motor unit to be fed solely through the choke or flow resistance. The control valve, when closed to the pressure liquid, preferably places the choke or flow resistance into communication with the reservoir.

The invention is illustrated by way of example in the accompanying drawings, in which—

Figure 2:
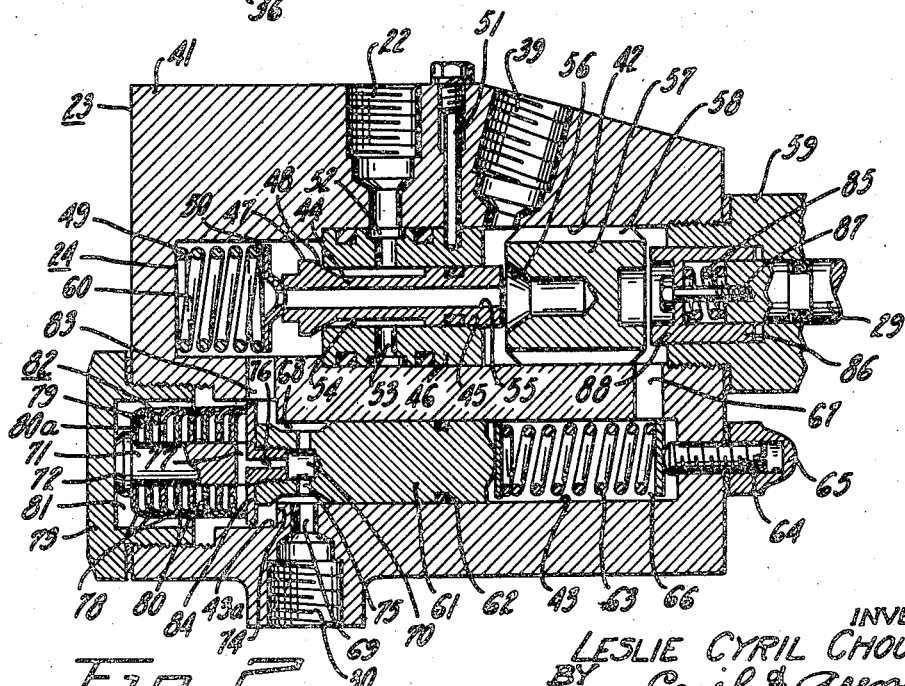

Figure 1 is a diagram showing the components of a liquid pressure operated controlling system suitable for engaging the band brakes of an epicyclic gear box; and Figure 2 is a sectional elevation of the control valve device drawn to an enlarged scale.

In the system shown in Figure 1 a pump 10, fed from a reservoir 11 through an inlet pipe 12, is arranged to deliver pressure liquid through a pipe 13 and cut-out valve 14 and a pipe 15 to an accumulator indicated generally at 16. This accumulator is of the usual construction and comprises a cylinder 17 fitted with a floating piston 18, which latter divides the interior of the cylinder into two working spaces, namely a space 19 which is filled with liquid and a space 20 containing compressed air so as to act as a spring. The accumulator is charged by forcing liquid under pressure into the working space 19, thus displacing the floating piston 18 and further compressing the air in the space 20; liquid under pressure can thus be withdrawn at will from the working space 19 and flows through a pipe to the inlet connection 22 of a control valve device, indicated generally at 23. This device incorporates a control valve 24, which will be described more fully hereafter, but which is operated by an electro-magnet 25 fed with current from a battery 26 when a control switch 27 is closed. The armature 28 of the electro-magnet is then drawn to the left and correspondingly moves a push-rod 29 when the control valve 24 has to be opened. The control valve device 23 has an outlet connection 30 for pressure liquid, connected by a pipe 31 with a single acting motor unit 32. This unit has a cylinder 33 containing a piston 34, which latter is connected by a link 35 with an arm 36 for operating a band brake (not shown) when pressure liquid is fed to the working space 37 of the cylinder 33. When pressure in the working space 37 falls the arm 36 and piston 34 are returned to their initial positions by a coiled tension spring 38. The control valve device 23 has a connection 39 communicating with the reservoir 11 by a pipe 40.

The internal construction of the control valve device 23 is shown in Figure 2, said device comprising a body 41 having two bores, namely, a bore 42 for the control valve 24 and a bore 43 for a pressure-responsive valve.

The control valve comprises a first plunger 44 of substantially mushroom shape, a stem portion 45 being arranged to slide in a liquid-tight manner through a sleeve 46, while a head 47 has a frusto-conical surface 48 which is normally urged into sealing engagement with the adjacent end of the sleeve 46 by means of a coiled compression spring 49 acting upon the valve member 44 through the medium of an annular thrust washer 50. The sleeve 46 is located by a set-screw 51 against axial movement along the bore 42. Said sleeve is formed with a circumferential groove 52, which communicates with the pressure inlet connection 22 and from the groove 52 a number of passages 53 extend radially inwards so as to communicate permanently with an annular space 54 surrounding a reduced portion of the stem 45. The valve member 44 is formed with an axial bore 55 and the end portion of its stem 45 is arranged to project from the sleeve 46 so as to be engageable by a frusto-conical seating 56 formed within the adjacent end of a second valve plunger 57. The latter is slidably mounted in the bore 42 and is grooved longitudinally at 58 so that both of its ends are in permanent communication with the reservoir 11 by way of the connection 39. A bush 59 is fitted into the end of the bore 42 and through it the push-rod 29 from the electro-magnet 28 (Figure 1) passes in a liquid-tight manner. In order to limit the thrust which can be transmitted through the push-rod 29 to the control valve 24, a strong compression spring 85 is provided within a sliding cap member 86 and is held in partial compression by a bolt 87 screwed into the push-rod 29. The end of the sliding cap member 86 is provided with a flange 88 adapted to engage the valve plunger 57 and urge the latter to the left when the electro-magnet is energised. It will be seen that this has the action of bringing the frusto-conical seating 56 into liquid-tight engagement with the stem 45, consequently isolating from the reservoir 11 the space 60 at the left-hand end of the bore 42. Further movement of the valve plunger 57 pushes the valve member 44 to the left and disengages the head 47 from the sleeve 45 so that pressure liquid is then able to flow from the connection 22, past the seating 48 and into the space 60. It will be seen that if the pressure of the liquid in the space 60 rises above a predetermined value when the electro-magnet 25 is energised, it acts to move the valve member 44 to its closed position against the action of the spring 85.

The pressure-responsive valve device comprises a pressure-responsive valve member 61 in the form of a substantially cylindrical plunger slidably mounted within the bore 43 and provided with a liquid-tight packing 62. It is urged towards the left by a coiled compression spring 63, having an adjustable abutment screw 64 in order that the force exerted by the spring 63 can be easily regulated from the exterior of the device. A cap nut 65 is provided in the usual manner to prevent leakage of liquid, since the space 66 within the bore 43 is connected with the reservoir 11 by way of a passage 67 in the body 41. Adjacent its other end the by-pass valve member 61 is formed with a circumferential groove 68, which is in permanent communication with a passage 69 leading to the pressure outlet connection 30. The valve member is moreover formed with a short axial bore 70, which is screw-threaded for the reception of a stem 71 having a head 72. The stem 71 is disposed within an enlarged portion 43a of the bore 43, this portion being closed by a cap 73. Further, the length of the stem 71 is arranged so that when the head 72 engages with the interior of the cap 73 under the action of the compression spring 63, the annular groove 68 partially overlaps the shoulder 74, as is shown in Figure 2. The bore 70 communicates with the circumferential groove 68 by passages 75 and also with an axial passage 76 which is formed in the stem 71 and leads into a plurality of radial passages 77 disposed adjacent the end of the pressure-responsive valve member 61.

A choke or flow restricting device, indicated generally at 82, is mounted upon the stem 71 and comprises a stack of discs or washers 78, each formed completely around its periphery with a flange, so that when said discs or washers are stacked as shown an annular space 79 is produced between each adjacent pair of discs or washers. Each disc or washer is formed with a single hole 80 and when the parts are assembled these holes are disposed alternately at opposite sides of the stem 71 so as to produce an extremely tortuous passage extending from the first hole 80a of the disc 78 nearest to the head 72, through all the spaces 79 to the passages 77 and the axial bore 70. The space 81 surrounding the choke 82 is connected with the space 60 by a passage 83 in the body 41.

The operation of the choke and pressure-responsive valve device is as follows. Normally the compression spring 63 holds the valve member 61 in its left-hand position, as shown, so that when the electro-magnet 25 is operated, and the control valve 24 is therefore opened, pressure liquid flowing from the connection 22 into the space 60 can pass through the passage 83 and thence directly into the circumferential groove 68 of the valve member 61; the pressure liquid then, of course, proceeds through the outlet connection 30 to the motor unit 32. It will be seen, however, that the liquid pressure which is then present in the space 81 acts over the whole cross-sectional area of the pressure-responsive valve member 61 to urge the latter to the right since the space 66 is in communication with the reservoir. Therefore, as the stroke of the motor piston 34 proceeds and the resistance to movement encountered by the arm 36 increases, the pressure of liquid tends to build up in the space 81 of the control valve device until said pressure reaches a value at which it is able to overcome the force of the compression spring 63. The pressure-responsive valve member 61 is therefore moved to the right until a washer 84, forming part of the choke assembly 82, butts against the shoulder 74; this, of course, shuts off direct communication between the passage 83 and the annular groove 68 but it will be seen that pressure liquid is still able to flow from the space 81 through the tortuous passage between the discs of the choke device 82, thence through the passages 77 and 76 and the passages 75 to the outlet connection 30. The choke device 82 therefore reduces the rate of flow of the liquid and effectively slows down the action of the motor unit 32 so as to reduce shock at the end of the stroke. When the electro-magnet 25 is released and the control valve device 24 returns to its off position the supply of pressure liquid to the space 81 is discontinued and said space is placed in communication with the reservoir by way of the axial passage 55 of the control valve member 44; as a result the spring 63 can return the pressure-responsive valve member 61 to its open position in readiness for the next operation. It will be seen that when the pressure-responsive valve is in its open position it provides two parallel paths for pressure liquid to the outlet connection 30, namely a direct connection from the space 81 into the annular groove 68, and a tortuous connection through the choke device 82. When the pressure-responsive valve closes the direct connection is cut off but the tortuous connection remains.

It will be understood that the arrangement which has been described is given merely by way of example and that various modifications may be made to suit requirements. The invention may, of course, be used for purposes other than that particularly described, for example, in liquid pressure operated controlling systems for clutches which are held in engagement by liquid pressure.

The flow-controlling device may be modified by forming the choke or flow resistance as a separate unit from the plunger, and the choke or flow resistance may take forms other than that described. The form of control valve described may be replaced by a simple plunger valve or any equivalent valve capable of connecting the passage leading to the flow-controlling device to either the pressure source or the reservoir.

What I claim is:

1. A control device for a fluid pressure system comprising inlet and outlet ports, a passageway connecting the inlet port to the outlet port, a control valve having a member constructed and arranged to be normally seated in the passageway, means for engaging said member for unseating the same and including a spring arranged to yield when the pressure in the passageway reaches a predetermined value to permit the member to be moved in a direction to be seated, a pressure responsive device having a valve member disposed in the passageway between the control valve and the outlet port in a manner to normally open the passageway to thereby provide a substantially unrestricted path for the fluid through said passageway to the outlet port and responsive to a second predetermined pressure to close the passageway, and restricted means associated with the pressure responsive device including passages connecting the passageway to the outlet port in a manner to pass fluid thereto when the valve member is in a position closing the passageway to thereby reduce the flow of fluid to the outlet port as compared with the flow of fluid thereto when the valve member is in its normally open position, whereby when the first mentioned predetermined pressure is reached to move the control valve member in a direction to be seated the flow to the outlet port is completely cut off.

2. A control device for a fluid pressure system comprising inlet and outlet ports, a passageway connecting the inlet port to the outlet port, a control valve having a member constructed and arranged to be normally seated in the passageway, means for engaging said member for unseating the same and including a spring arranged to yield when the pressure in the passageway reaches a predetermined value to permit the member to be moved in a direction to be seated, a pressure responsive device having a valve member disposed in the passageway between the control valve and the outlet port in a manner to normally open the passageway to thereby provide a substantially unrestricted path for the fluid through said passageway to the outlet port and responsive to a second predetermined pressure to close the passageway, adjustable means for causing the second predetermined pressure acting on the valve member to be varied, and restricted means associated with the pressure responsive device including passages connecting the passageway to the outlet port in a manner to pass fluid thereto when the valve member is in a position closing the passageway to thereby reduce the flow of fluid to the outlet port as compared with the flow of fluid thereto when the valve member is in its normally open position, whereby when the first mentioned predetermined pressure is reached to move the control valve member in a direction to be seated the flow to the outlet port is completely cut off.

3. A control device for a fluid pressure system comprising inlet, exhaust, and outlet ports, a passageway connecting the inlet port to the outlet port, a control valve having a member provided with a longitudinal bore therethrough forming a passage between the passageway and the exhaust port and constructed and arranged to be normally seated in the passageway, means for engaging said member for unseating the same and including a spring arranged to yield when the pressure in the passageway reaches a predetermined value to permit the member to be moved in a direction to be seated, said means including a plunger interposed between the member and the spring and constructed and arranged to engage the member in a manner to cut off flow between the passageway and the exhaust port and movable away from the member in response to said predetermined pressure to connect said passageway to exhaust port, a pressure responsive device having a valve member disposed in the passageway between the control valve and the outlet port in a manner to normally open the passageway to thereby provide a substantially unrestricted path for the fluid through said passageway to the outlet port and responsive to a second predetermined pressure to close the passageway, and restricted means associated with the pressure responsive device including passages connecting the passageway to the outlet port in a manner to pass fluid thereto when the valve member is in a position closing the passageway to thereby reduce the flow of fluid to the outlet port as compared with the flow of fluid thereto when the valve member is in its normally open position, whereby when the first mentioned predetermined pressure is reached to move the control valve member in a direction to be seated the flow to the outlet port is completely cut off.

4. A control device for a fluid pressure system comprising inlet and outlet ports, a passageway connecting the inlet port to the outlet port, a pressure responsive device located in the passageway to selectively provide a substantially unrestricted passage between the inlet and outlet ports at times and a relatively restricted passage at other times, said pressure responsive device including a valve member normally spring urged in a direction to open the passageway to thereby provide the substantially unrestricted passage and urged by a predetermined pressure in the opposite direction to close the passageway, a flow resistance for providing a relatively restricted passage in parallel with the substantially unrestricted passage and connecting the outlet port to the passageway to thereby reduce the flow to the outlet port when the valve member closes the passageway, and a control valve mechanism including a member constructed and arranged to normally close the passageway and movable to a position to open the passageway, said control valve mechanism including a spring through which force is transmitted to move the member to a position to open the passageway, the construction and arrangement of the last named spring being such that when the pressure in the passageway reaches a preselected value the member is moved in a direction to compress the spring to close the passageway to stop the flow of fluid to the outlet port.

5. A control device for a fluid pressure system comprising inlet and outlet ports, a passageway connecting the inlet port to the outlet port, a pressure responsive device located in the passageway to selectively provide a substantially unrestricted passage between the inlet and outlet at times and a relatively restricted passage at other times, said pressure responsive device including a valve member normally spring urged in a direction to open the passageway to thereby provide the substantially unrestricted passage and urged by predetermined pressure in the opposite direction to close the passageway, a flow resistance carried by the valve member for providing a relatively restricted passage in parallel with the substantially unrestricted passage and connecting the outlet port to the passageway to thereby reduce the flow to the outlet port when the valve member closes the passageway, and a control valve mechanism including a member constructed and arranged to normally close the passageway and movable to a position to open the passageway, said control valve mechanism including a spring through which force is transmitted to move the member to a position to open the passageway, the construction and arrangement of the last named spring being such that when the pressure in the passageway reaches a preselected value the member is moved in a direction to compress the spring to close the passageway to stop the flow of fluid to the outlet port.

6. A control device as claimed in claim 4, wherein the flow resistance comprises a stem secured to the valve member and having a passage therein in communication with the outlet port, a stack of apertured plates assembled in spaced relationship upon the stem so that the apertures of adjacent plates are not in registry, the apertures of the bottom plate communicating with the stem passage, to thereby provide a circuitous path through which all fluid must flow at times.

7. A control device as claimed in claim 4, wherein the flow resistance comprises a stem secured to the valve member and having a passage therein in communication with the outlet port, a stack of apertured plates assembled in spaced relationship upon the stem so that the apertures of adjacent plates are not in registry, to thereby provide a circuitous path through which all fluid must flow at times, the plates being dished so that when stacked one upon the other they form a succession of shallow closed chambers communicating with one another through said apertures, the bottom chamber thereof communicating with said stem passages.

LESLIE CYRIL CHOUINGS.

REFERENCES CITED

The following references are of record in the file of this patent:

UNITED STATES PATENTS

| Number | Name | Date |
| --- | --- | --- |
| 519,436 | Schweim | May 8, 1894 |
| 616,730 | Reynolds | Dec. 27, 1898 |
| 623,151 | Herdman | Apr. 18, 1899 |
| 821,859 | Clegg | May 29, 1906 |
| 824,425 | Johnson | June 26, 1906 |
| 963,906 | Larsson | July 20, 1910 |
| 1,353,557 | Averill | Sept. 21, 1920 |
| 1,781,366 | Campula | Nov. 11, 1930 |
| 2,167,328 | Beggs | July 25, 1939 |
| 2,376,124 | Coulbourn | May 15, 1945 |